United States Patent
Kobayashi

(10) Patent No.: US 11,082,225 B2
(45) Date of Patent: Aug. 3, 2021

(54) INFORMATION PROCESSING SYSTEM AND CONTROL METHOD THEREFOR

(71) Applicant: CANON KABUSHIKI KAISHA, Tokyo (JP)

(72) Inventor: Makoto Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 176 days.

(21) Appl. No.: 16/270,458

(22) Filed: Feb. 7, 2019

(65) Prior Publication Data
US 2019/0253251 A1 Aug. 15, 2019

(30) Foreign Application Priority Data
Feb. 9, 2018 (JP) .............................. JP2018-022405

(51) Int. Cl.
| | |
|---|---|
| *H04L 9/32* | (2006.01) |
| *H04L 29/06* | (2006.01) |
| *H04L 9/08* | (2006.01) |
| *H04W 12/08* | (2021.01) |

(52) U.S. Cl.
CPC .......... *H04L 9/3213* (2013.01); *H04L 9/0819* (2013.01); *H04L 9/3247* (2013.01); *H04L 63/0807* (2013.01); *H04L 63/0815* (2013.01); *H04L 63/0853* (2013.01); *H04L 63/10* (2013.01); *H04L 63/102* (2013.01); *H04W 12/0804* (2019.01)

(58) Field of Classification Search
CPC ............... H04L 9/3213; H04L 63/0807; H04L 63/0815; H04L 63/10; H04L 63/102; H04L 9/0819; H04L 9/3247; H04L 63/0853; H04L 63/08; H04W 12/0804
See application file for complete search history.

(56) References Cited

U.S. PATENT DOCUMENTS

| | | | | |
|---|---|---|---|---|
| 8,650,622 | B2* | 2/2014 | Murakami | ...... H04W 12/04031 726/4 |
| 8,782,411 | B2* | 7/2014 | Nimashakavi | ........ H04L 9/3213 713/168 |
| 8,875,243 | B1* | 10/2014 | Cherukumudi | ....... H04L 63/102 726/4 |

(Continued)

FOREIGN PATENT DOCUMENTS

| | | |
|---|---|---|
| CN | 103139181 A | 6/2013 |
| CN | 104255007 A | 12/2014 |

(Continued)

OTHER PUBLICATIONS

Jones, M., et al "JSON Web Token (JWT) Profile for OAuth 2.0 Client Authentication and Authorization Grants", Apr. 28, 2014, pp. 1-14.

(Continued)

*Primary Examiner* — Matthew Smithers
(74) *Attorney, Agent, or Firm* — Canon U.S.A., Inc. IP Division

(57) ABSTRACT

A client specifies a first authorization server based on an authorization response corresponding to an authorization request transmitted by the client, and transmits a token request for requesting an authorization token to the first authorization server. The first authorization server issues the authorization token in response to the token request.

13 Claims, 13 Drawing Sheets

(56) References Cited

U.S. PATENT DOCUMENTS

| | | | | |
|---|---|---|---|---|
| 10,496,342 B2* | 12/2019 | Hirata | .................. | H04L 67/10 |
| 10,754,934 B2* | 8/2020 | Kobayashi | .............. | G06F 21/31 |
| 2012/0159571 A1* | 6/2012 | Novack | ................ | H04L 63/107 |
| | | | | 726/3 |
| 2013/0007846 A1 | 1/2013 | Murakami et al. | | |
| 2015/0121464 A1* | 4/2015 | Hughes, Jr. | ........... | H04L 63/105 |
| | | | | 726/4 |
| 2016/0301619 A1* | 10/2016 | Bashir | ................ | H04L 67/1097 |
| 2017/0026376 A1* | 1/2017 | Matsugashita | .......... | H04L 63/08 |
| 2017/0250993 A1* | 8/2017 | Reid | ....................... | H04L 63/08 |
| 2018/0167397 A1* | 6/2018 | Zhang | .............. | H04W 12/0608 |
| 2018/0183802 A1* | 6/2018 | Choyi | .................. | H04L 63/102 |
| 2018/0213038 A1* | 7/2018 | Chung | ............... | H04L 12/1471 |
| 2019/0156008 A1* | 5/2019 | Tamura | ............... | H04L 63/0892 |
| 2019/0173877 A1* | 6/2019 | Yamanakajima | ... | H04L 63/0853 |

FOREIGN PATENT DOCUMENTS

| | | |
|---|---|---|
| CN | 104350501 A | 2/2015 |
| CN | 104917721 A | 9/2015 |
| CN | 105100007 A | 11/2015 |
| CN | 105323237 A | 2/2016 |
| JP | 2017-107396 A | 6/2017 |
| WO | 2012/119620 A1 | 9/2012 |

OTHER PUBLICATIONS

Hardt, D., "Distributed OAuth", Nov. 14, 2017, pp. 1-6.

* cited by examiner

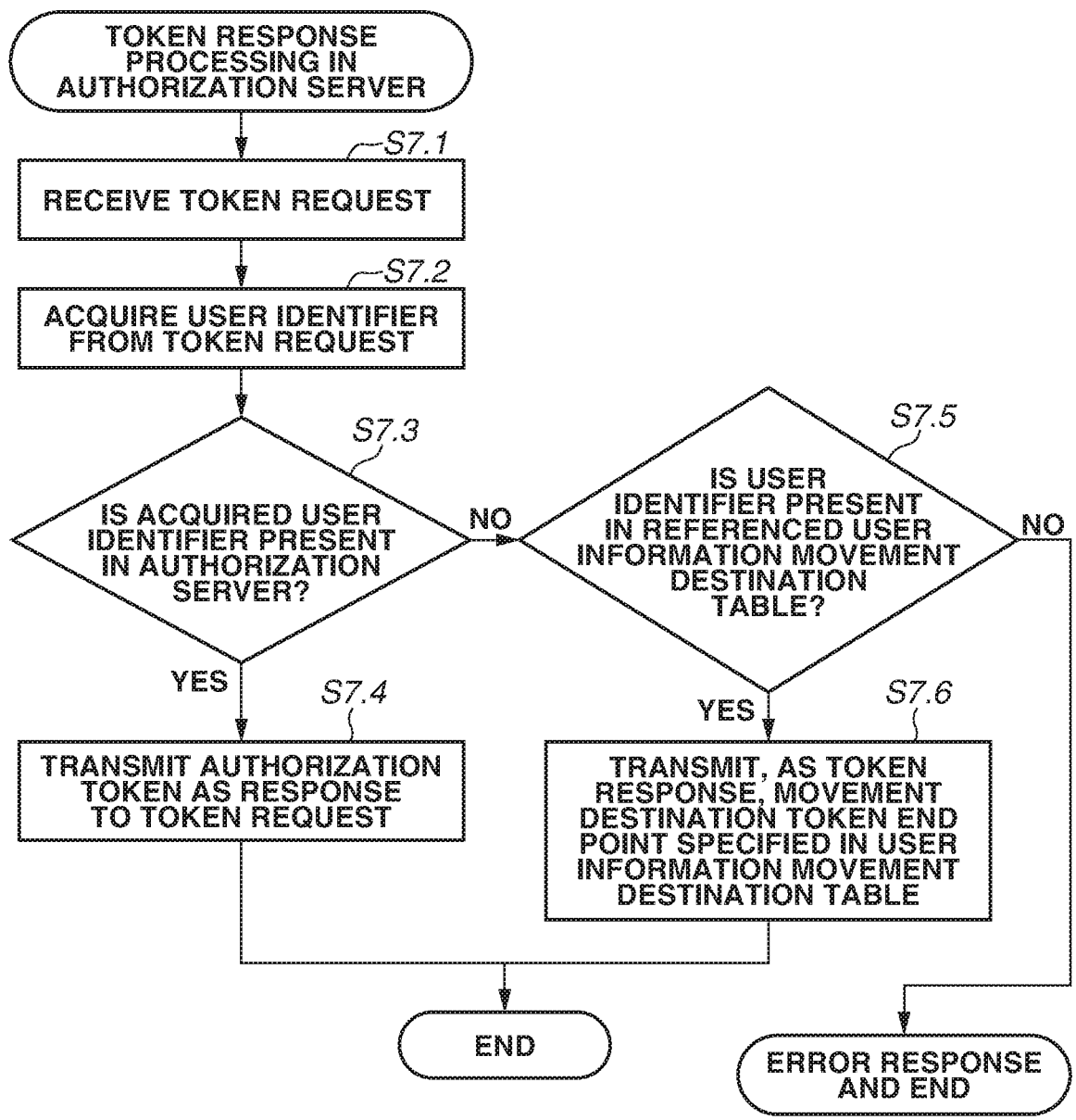

FIG.8A

```
{
"typ":"Assertion",
"alg":"ES256",
"kid":"7f7c98c2-fdb7-47a5-8f50-1e13f59f81ee"
}
```

FIG.8B

```
{
"response_type":"id_token",
"iss":"ODBlMWUwYzgtNjlkZS00OWUyLWExNGItYTUxOTY1OTcxMWIw",
"sub":"ODBlMWUwYzgtNjlkZS00OWUyLWExNGItYTUxOTY1OTcxMWIw",
 "iat":1508146618,
 "exp":1508149918,
"client_id":"ODBlMWUwYzgtNjlkZS00OWUyLWExNGItYTUxOTY1OTcxMWIw",
"redirect_uri":"https://redirect.example.com/",
"state":"MmYyYmZkYzYtMTVmNi00ZGEwLWI0MTktM2U2YWU4OTBhYTUzCg"
}
```

FIG.9A

```
{
 "alg":"ES256",
 "kid":"bf80c2e1-995d-4676-8d05-ebe0f8d49b68"
}
```

FIG.9B

```
{
"iss":"https://eu-auth.example.com",
"sub":"dXNlcjJAMTEwQUI",
"aud":"ODBlMWUwYzgtNjlkZS00OWUyLWExNGItYTUxOTY1OTcxMWIw",
"nonce":"n-0S6_WzA2Mj",
"iat":1508146918,
"exp":1508150518
}
```

FIG.10A

```
{
"typ":"Assertion",
"alg":"ES256",
"kid":"7f7c98c2-fdb7-47a5-8f50-1e13f59f81ee"
}
```

FIG.10B

```
{
"response_type":"id_token",
"redirect_uri":"https://redirect.example.com/",
"iss":"ODBlMWUwYzgtNjlkZS00OWUyLWExNGItYTUxOTY1OTcxMWIw",
"sub":"dXNlcjJAMTEwQUl",
"iat":1508147518,
"exp":1508151118
}
```

FIG.11

```
HTTP/1.1 200 OK
    Content-Type:application/json;charset=UTF-8
    Cache-Control:no-store
    Pragma:no-cache {
      "destination_uri":"https://us.example.com/oauth2/token"
    }
```

INFORMATION PROCESSING SYSTEM AND CONTROL METHOD THEREFOR

BACKGROUND OF THE INVENTION

Field of the Invention

The present invention relates to an information processing system for specifying an authorization end point of an authorization server, and a control method therefor.

Description of the Related Art

There is a configuration in which an application included in a client such as a multifunction peripheral (MFP) acquires an authorization token from an authorization server via a token provider included in the client. The authorization token is a token indicating that a client, which has received delegation of authority by an authorization operation performed by an authenticated user, has permitted access to an application programming interface (API) released by a resource server. By using the authorization token, the client can access the API released by the resource server without having to pass user information such as an ID, password information, and authorization information to the resource server or the authorization server. For example, if the client is an MFP, by using the acquired authorization token, the MFP can use web services such as a print service and a business form service that are provided by the resource server to display data and execute printing.

The authorization token is issued by the authorization server executing an Authorization Code Grant flow in a standard protocol called OAuth 2.0. More specifically, the user authorizes, through a web browser, the client to use the web services provided by the resource server, and the authorization server issues the authorization token to the token provider that has transmitted a token request. The token request is a request transmitted to the authorization server so that the token provider can acquire the authorization token.

Japanese Patent Application Laid-Open No. 2017-107396 discusses a system in which an application included in a client acquires an authorization token from an authorization server via a token provider included in the client.

SUMMARY OF THE INVENTION

According to an aspect of the present invention, an information processing system includes a client configured to transmit an authorization request used by a user to authorize access by the client to a resource server, and two or more authorization servers present in different regions. The authorization servers each include a first specifying unit configured to specify a first authorization server in which user information about the user who authorizes the access is located. The client includes a second specifying unit configured to specify the authorization servers present in the regions based on region information about the regions. The authorization servers each include a first transmission unit configured to transmit, upon receiving the authorization request, an authentication request for authenticating the user to the first authorization server that is specified by the first specifying unit, the user information about the user who authorizes the access being located in the first authorization server. The first authorization server includes a second transmission unit configured to authenticate the user upon transmission of the authentication request by the first transmission unit, and to transmit, to the client, an authorization response as a response to the authorization request together with information indicating, as a transmission destination, the first authorization server in which the user information about the authenticated user is located. The client includes a third transmission unit configured to transmit a token request for requesting an authorization token for accessing the resource server to the first authorization server that is specified by the second specifying unit based on the authorization response transmitted by the second transmission unit. The first authorization server includes an issuance unit configured to issue the authorization token in response to the token request transmitted by the third transmission unit.

Further features of the present invention will become apparent from the following description of exemplary embodiments with reference to e attached drawings.

BRIEF DESCRIPTION OF THE DRAWINGS

FIG. 7 is a flowchart illustrating token response processing in an authorization server.

FIGS. 8A and 8B are diagrams each illustrating an example of an authorization request (authorization assertion) claim in a JavaScript Object Notation (JSON) Web Token (JWT) format.

FIGS. 9A and 9B are diagrams each illustrating an example of an id_token claim.

FIGS. 10A and 10B are diagrams each illustrating an example of a token request (token assertion) claim.

FIG. 11 is a diagram illustrating an example of a token response including user movement destination information.

DESCRIPTION OF THE EMBODIMENTS

Figure 1:
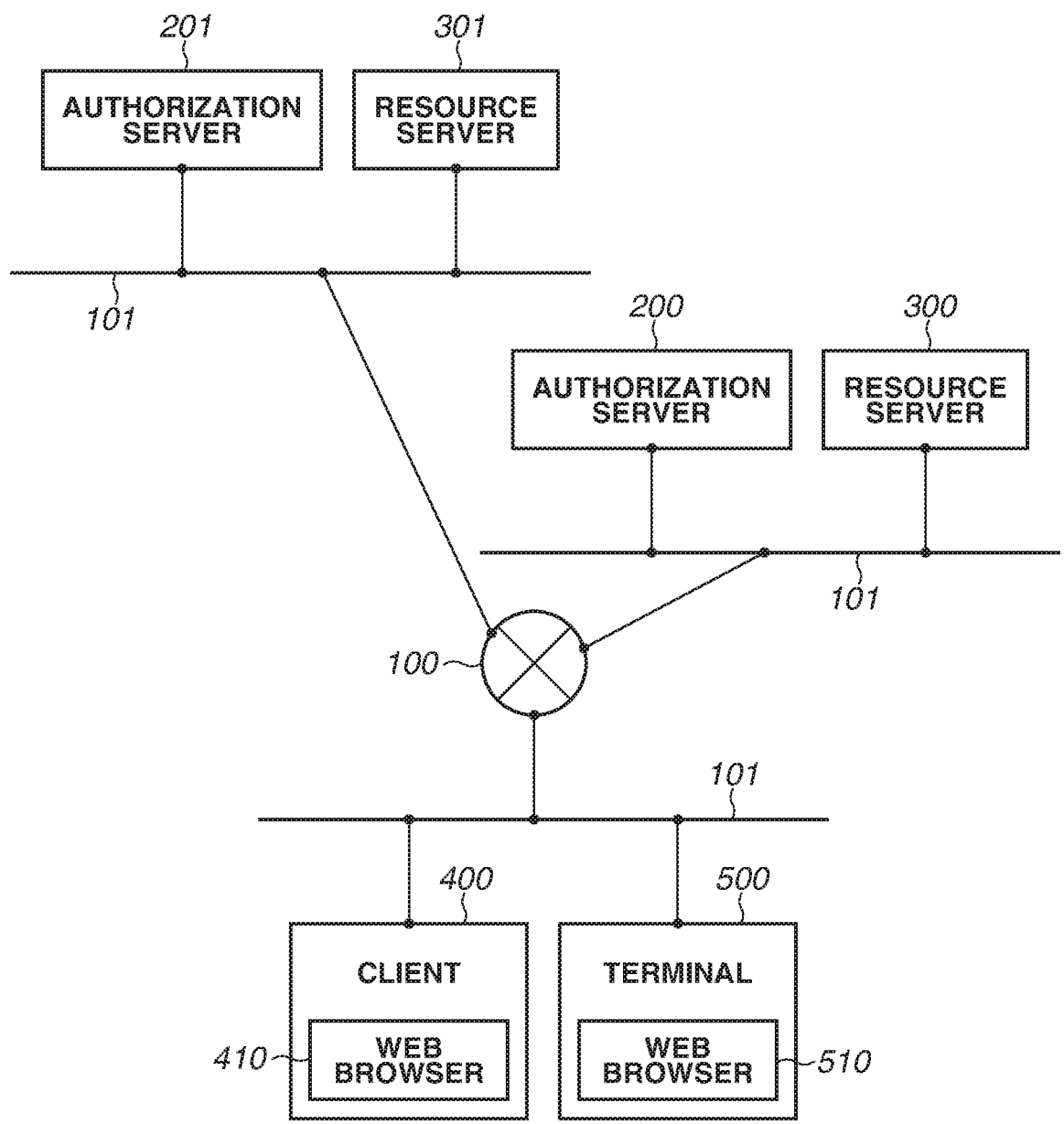
FIG. 1 is a block diagram illustrating a network configuration of an information processing system.

User information described above is managed by an authorization server in a specific region (hereinafter referred to as a region). In a case where a plurality of pieces of user information corresponding respectively to a plurality of users is provided, these pieces of user information are not always collectively managed by one authorization server. For example, if an application is distributed to a plurality of regions and used worldwide, user information about a user who uses the application is managed by an authorization server in a region in which the user is located. The authorization server in which the user information is located issues an authorization token. The authorization token is issued by the authorization server corresponding to the location of the user information. This is because movement or sharing of the user information to another region is limited from a viewpoint of personal information protection, security, and the like, and the user is authenticated using the user information of which the movement or sharing is limited. When an authorization is granted by the authenticated user, the authorization token is issued.

The authorization is granted by the user through an authorization confirmation screen (described below) that is displayed as a result of transmitting an authorization request to the authorization server from a client. Assuming that an application is used in a plurality of regions, there are a large number of options for the authorization server to which the authorization request is transmitted. Accordingly, a token provider needs to specify the authorization server to which the authorization request is transmitted and in which the user information is located.

As a method for specifying the authorization server, for example, a method of designating a region by a user's operation may be employed. However, this method requires a troublesome manual operation and causes a security issue in that selection of a region is left to the user's operation.

The present invention is directed to appropriately selecting an authorization server in which user information is present while maintaining security, and to issue an authorization token by the selected authorization server. According to the present invention, it is possible to appropriately select an authorization server in which user information is present while maintaining security, and to issue an authorization token by the selected authorization server.

Exemplary embodiments for carrying out the present invention will be described below with reference to the drawings. When there is no need to distinguish between authorization servers 200 and 201 described below, the authorization servers 200 and 201 are referred to as "authorization server 200 (201)". When there is no need to distinguish between resource servers 300 and 301 described below, the resource servers 300 and 301 are referred to as "resource server 300 (301)". When the authorization server 201 issues an authorization token, an application programming interface (API) released by the resource server 301 is accessed using the authorization token issued by the authorization server 201. The same holds true for a relationship between the authorization server 200 and the resource server 300.

An information processing system according to a first exemplary embodiment of the present invention will be described with reference to FIG. 1. The information processing system is implemented by a network configuration as illustrated in FIG. 1. A wide area network (WAN) 100 is constructed by a World Wide Web (WWW) system. The WAN 100 and various devices 200 to 500 are connected via a local area network (LAN) 101.

The authorization server 200 (201) is a server that implements OAuth 2.0 and performs processing such as reception and management of an authentication request. FIG. 1 illustrates a configuration in which the authorization server 200 and the resource server 300 are connected via the LAN 101 and the authorization server 201 and the resource server 301 are connected via the LAN 101. However, a configuration in which the authorization server 200 and the resource server 300 are connected via the WAN 100 and the authorization server 201 and the resource server 301 are connected via the WAN 100 can also be used.

The authorization server 200 (201) is connected to a database server (not illustrated) via the LAN 101. Data used by the authorization server 200 (201) to implement its own function may be stored in the database server. The present exemplary embodiment is described assuming that the authorization server 200 and the resource server 300 are separate servers and the authorization server 201 and the resource server 301 are also separate servers. However, the physical configuration of various servers is not particularly limited thereto. For example, functions of both types of servers may be configured on the same server, or a function of a single authorization server or a single resource server may be implemented by a plurality of servers.

The configuration in terms of location of the resource server 300 and the authorization server 200 (or the resource server 301 and the authorization server 201) is not limited to a configuration in which both of the servers are located in the same region or in the same system. The configuration in which the both servers are located is not particularly limited as long as the resource server 300 can make an inquiry about an authorization token issued by the authorization server 200. Alternatively, the resource server 300 may verify signature information received together with the authorization token.

Examples of the client 400 include a printer, a multifunction peripheral (MEP), a personal computer (PC), and a smartphone. The terminal 500 includes a web browser 510. Examples of the terminal 500 include a PC and a smartphone. A user can use the functions of the various devices 200 to 500, such as a user authentication request to the authorization server 200 (201) and a login operation performed on the client 400, through the web browser 510.

The client 400 also includes a web browser 410. The user executes an authorization operation described below by operating the web browser 410 or the web browser 510. The client 400 and the terminal 500 are connected via the LAN 101. When there is no need to distinguish between the web browsers 410 and 510 to be used to execute the operation, the web browsers 410 and 510 are hereinafter referred to as the "web browser 410 (510)".

In the present exemplary embodiment, the client 400, the terminal 500, the authorization server 200, and the resource server 300 are located in a region "jp", and the authorization server 201 and the resource server 301 are located in a region "eu". The term region used in the present exemplary embodiment refers to a region where there are some kind of limitations in term of information technology, laws, and the like on the movement of the user information to the outside of the region from a viewpoint of personal information protection, security, and the like.

Figure 2:
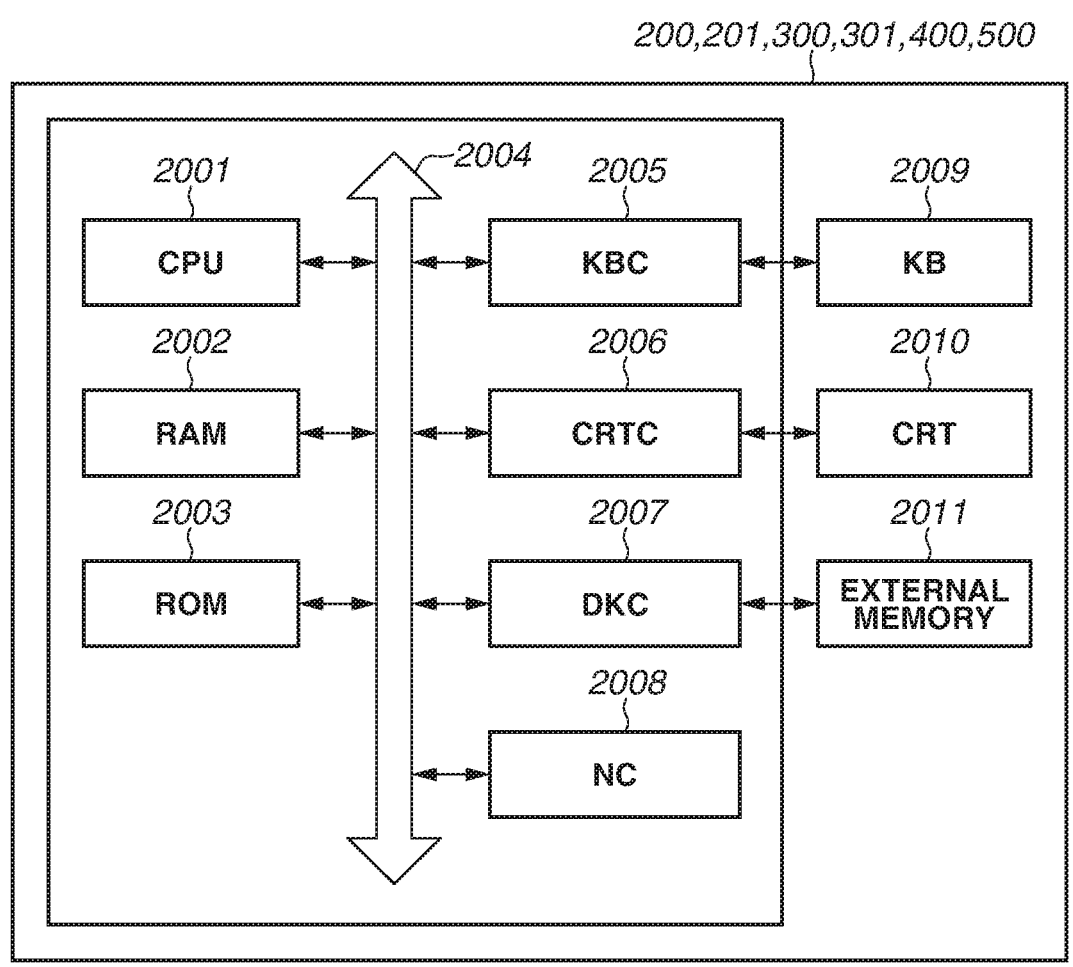
FIG. 2 is a block diagram illustrating a hardware configuration of various devices.

Referring next to FIG. 2, the hardware configuration of each of the authorization server 200 (201), the resource server 300 (301), the client 400, and the terminal 500 will be described. FIG. 2 is a block diagram illustrating a general information processing apparatus. The hardware configuration of the general information processing apparatus or a virtual hardware configuration of an information processing apparatus provided as an Infrastructure as a Service IaaS can be applied to the various devices 200 to 500 according to the present exemplary embodiment. Although FIG. 2 illustrates the hardware configuration by taking the client 400 as an example, the resource server 300 (301), the authorization server 200 (201), and the terminal 500 also have a hardware configuration similar to that of the client 400.

A central processing unit (CPU) 2001 is a unit that reads a program from a random access memory (RAM) 2002, a read-only memory (ROM) 2003, an external memory 2011, or the like, executes instructions of the program, and controls the client 400. A sequence described below is implemented by executing the instructions of the program. In addition, the CPU 2001 also controls each block connected to a system bus 2004.

The RAM 2002 is a work memory used by the CPU 2001 to execute the instructions. A program such as an operating system (OS) and an application stored in the ROM 2003 or the external memory 2011 is loaded into the RAM 2002. The CPU 2001 sequentially reads out the instructions of the program, thereby executing the instructions. The ROM 2003 is a storage device on which a built-in program including an application program and an OS, and data is recorded.

A keyboard controller (KBC) 2005 is a unit that controls an input from a keyboard (KB) 2009 or a pointing device (not illustrated). A cathode ray tube controller (CRTC) 2006 is a unit that controls display of a cathode ray tube (CRT) display 2010. A disk controller (DKC) 2007 is a unit that controls data access to the external memory 2011. A network controller (NC) 2008 executes control processing on communication with another device connected via the WAN 100 or the LAN 101. A virtual information processing apparatus provided as an IaaS does not include the KBC 2005 and the CRTC 2006, and is configured to be operated through a keyboard or a CRT display included in a terminal connected via the NC 2008.

In the following descriptions, unless otherwise noted, the CPU 2001 is the main piece of hardware that executes the functions of the various devices 200 to 500, and a program installed in the RAM 2002, the ROM 2003, the external memory 2011, or the like is the main piece of software.

Figure 3:
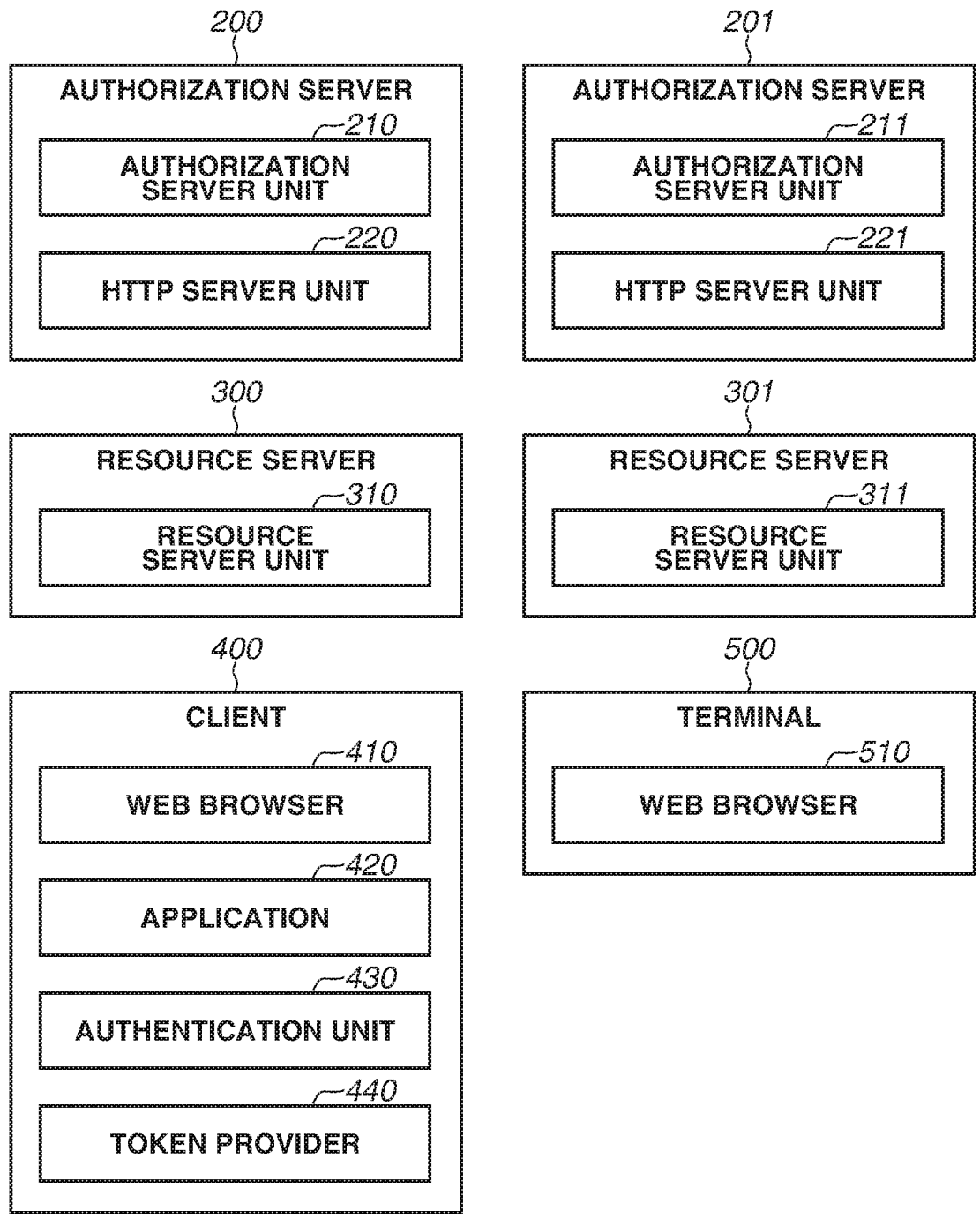
FIG. 3 is a block diagram illustrating a software configuration of various devices constituting the information processing system.

Referring next to FIG. 3, functions included in the authorization server 200 (201), the resource server 300 (301), the client 400, and the terminal 500 will be described. The authorization server 201 includes functions similar to the functions of the authorization server 200, and the resource server 300 includes functions similar to the functions of the resource server 301. Accordingly, in FIG. 3, the client 400, the authorization server 200, and the resource server 300 are described by way of example.

The authorization server 200 includes an authorization server unit 210 and a HyperText Transfer Protocol (HTTP) server unit 220. The HTTP server unit 220 is a function that is connected to each of the client 400 and the terminal 500 via the WAN 100, and performs HTTP communication with the web browser 410 (510) and an application 420 described below. The HTTP server unit 220 can communicate by using Secure Sockets Layer (SSL)/Transport Layer Security (TLS) and includes a certificate store (not illustrated).

The authorization server unit 210 is a function that receives a request from the web browser 410 (510) via the HTTP server unit 220 and sends a result of the received request as a response. More specifically, the HTTP server unit 220 receives a request for user authentication from the web browser 410 (510) and generates an authentication token associated with user information of a user who is successfully authenticated. The generated authentication token is sent to the web browser 410 (510). The authentication token is a token indicating that the user has logged in to the authorization server 200, or a token for verifying whether the user is authenticated in the authorization server 200. By using the authentication token, the authorization server 200 can identify the user. The authorization server unit 210 can also be configured to hold a private key for providing the authorization token with signature information. In this case, the private key is used to provide the authorization token with the signature information, and the authorization token with the signature information is issued to the client 400.

The resource server 300 includes a resource server unit 310. The resource server unit 310 is a function that releases the API for providing a web service. Similar to the authorization server 200, the resource server 300 may be configured to include an HTTP server unit and to transmit and receive information to and from an external apparatus via the HTTP server unit.

The client 400 includes the web browser 410, the application 420, an authentication unit 430, and the token provider 440. The web browser 410 is a function that is implemented by a user agent for using the WWW. The web browser 410 communicates with the authorization server 200 and the token provider 440 by a user's operation. The web browser 510 included in the terminal 500 is a function similar to the web browser 410. The application 420 is a function that acquires the authorization token from the authorization server 200 via the token provider 440. The application 420 can utilize the API, which is released by the resource server 300, by using the acquired authorization token.

The token provider 440 receives an authorization token request from the application 420 and communicates with the authorization server 200 to acquire the authorization token. The user communicates with the authorization server 200 and the token provider 440 by using the web browser 410 (510), thereby performing the authorization operation.

The term "authorization token request" used herein refers to a request transmitted to the token provider 440 by the application 420 to acquire the authorization token. The term "token request" used herein refers to a request transmitted to the authorization server 200 (201) by the token provider 440 to acquire the authorization token. It should be noted that these requests have different names because transmission destinations and transmission sources of the requests are different even though both of the requests are made to acquire the same authorization token.

The token provider 440 includes, as vendor default credentials, a client certificate defined in an X.509 format to certify the token provider 440 itself, and a private key for the client certificate. By the token provider 440 using the client certificate and the private key therefor to establish communication with the authorization server 200, the authorization server 200 can authenticate the token provider 440.

The authentication unit 430 is a function that authenticates the user. The user inputs a local user ID and a local user password on an input screen (not illustrated) of the client 400 to use a function of the client 400. The client 400 that has received input information compares the input information with information (the local user ID and the local user password) that is preliminarily registered in the authentication unit 430 to perform authentication processing of the user and to generate a login context. The authentication processing is not limited to this configuration. For example, authentication using an integrated circuit (IC) card or biometric authentication using a fingerprint or the like may also be used.

The term "login context" used herein refers to information for identifying a local user in the client 400. For example, the login context includes a local user ID. The login context is generated in the OS (not illustrated) of the client 400 when the local user logs in to the client 400, and the login context is deleted when the local user logs off the client 400. When the login context is generated by a login operation by the local user, a web page to which the logged-in local user has access authority is released on the web browser 410. The login context is deleted by a log-off operation by the local user so that security is ensured while preventing the web page to which the local user has access authority from being released to another user. The login context generated by the authentication unit 430 is shared among the application 420, the authentication unit 430, and the token provider 440.

The present exemplary embodiment describes a configuration in which the user performs the login operation by directly operating the client 400. However, a configuration in which the user performs the login operation by remotely operating the client 400 through the web browser 510 can also be used. In this case, the authentication unit 430 returns a login screen (not illustrated) to the web browser 510. The user inputs the local user ID and the local user password on the login screen to have the user information authenticated.

Figure 4:
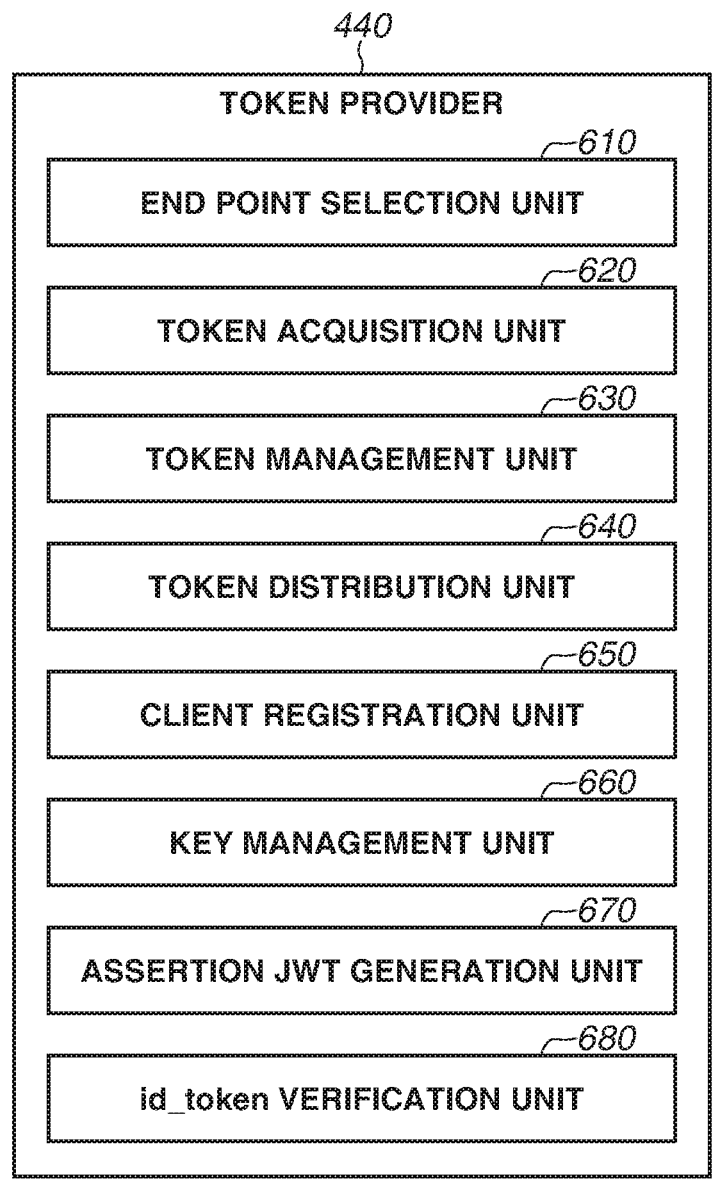
FIG. 4 is a block diagram illustrating functions included in a token provider.

Functions included in the token provider 440 will be described with reference to FIG. 4. The token provider 440 includes an end point selection unit 610, a token acquisition unit 620, a token management unit 630, a token distribution unit 640, a client registration unit 650, a key management unit 660, an assertion JavaScript Object Notation (JSON) Web Token (JWT) generation unit 670, and an id_token verification unit 680.

The end point selection unit 610 is a function that transmits an authorization request to an authorization end point in an authorization flow described below. In this case, the end point selection unit 610 selects an authorization end point Uniform Resource Identifier (URI) common to all regions (hereinafter, referred to as an all regions common URI), Table 1 illustrates an example of the all regions common URI.

TABLE 1

| All Regions Common URI | |
|---|---|
| No. | Authorization End Point URI |
| 1 | https://example.com/oauth2/authorize |

Table 1 includes columns for "No." lumber) and "Authorization End Point URI", and the all regions common URI is registered in the "Authorization End Point URI". The registration of the all regions common URI in Table 1 may be executed using an external application or the like. The configuration for registering the all regions common URI in Table 1 is not particularly limited.

The token acquisition unit 620 is a function that transmits a token request to a token end point in the authorization flow described below. The token end point is determined by the token acquisition unit 620 based on id_token described below.

The token management unit 630 is a function that manages, for each local user ID, the authorization token acquired by the token acquisition unit 620. Table 2 illustrates an example of a token database managed by the token management unit 630.

TABLE 2

| Token Database | | | |
|---|---|---|---|
| No. | Local User ID | Region | Authorization Token |
| 1 | Local_user1 | jp | 77qfvfm6wkl8vjvckkli2sat35yb9j |
| 2 | Local_user2 | eu | wsmkhii4roya2nluhblqdmekdrgqwb |
| 3 | Local_user3 | eu | t3geevyl8czkcb9lujmtgchmuyivzg |

Table 2 includes columns for "No.", "local user ID", "region", and "authorization token", and the local user ID is set as a main key. Table 2 is generated or updated by executing the authorization flow (S1.0 to S2.2) described below, and is managed by the token management unit 630.

In this case, information stored in the "region" is information acquired from the id_token described below, and indicates the region of the authorization server from which the authorization token is acquired.

The token distribution unit 640 is a function that specifies, based on Table 2, the region information and the authorization token associated with the local user ID (included in the authorization token request) that is received from the application 420, and transmits the authorization token to the application 420.

Figure 5:
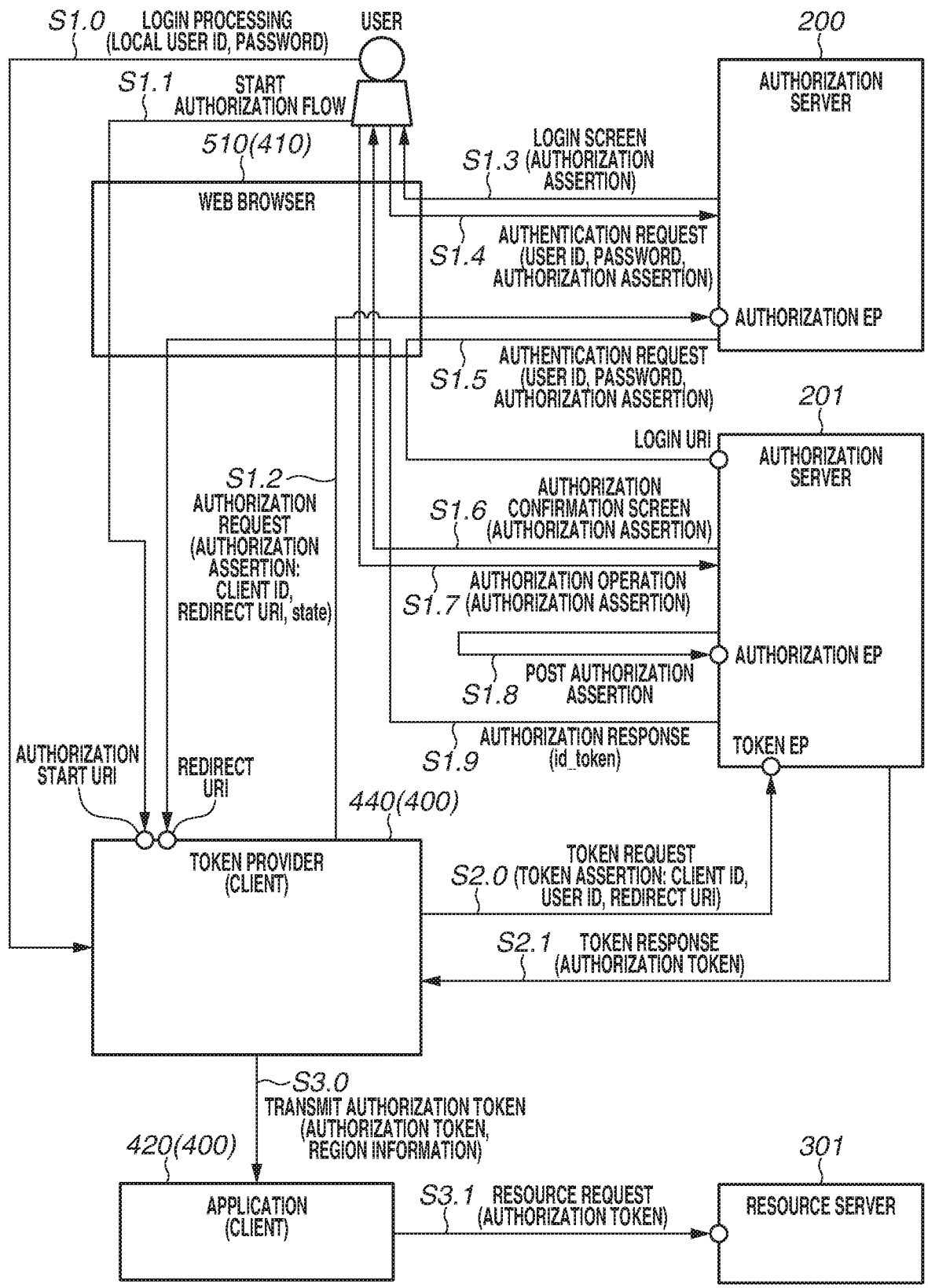
FIG. 5 is an authorization flowchart in the information processing system.

If the local user ID received from the application 420 is not present in Table 2, it is determined that the authorization flow illustrated in FIG. 5 is not executed. Further, the end point selection unit 610 executes the authorization flow illustrated in FIG. 5, and stores the acquired authorization token, local user ID, and region information acquired from the id_token described below in the token management unit 630 (Table 2).

The client registration unit 650 is a function that performs client registration for registering the client 400 in the authorization server 200 (201). The key management unit 660 holds an assertion private key (encryption key for assertion JWT signature) that is acquired during the client registration. This key is used to make a signature for an authorization assertion and a token assertion described below.

The key management unit 660 preliminarily holds an id_token public key (decryption key for verifying the signature of id_token) corresponding to an id_token private key (encryption key for providing the id_token with a signature) held in the authorization server 200 (201), and has a function for holding and acquiring the keys.

The assertion JWT generation unit 670 is a function that generates the authorization assertion and the token assertion described below by using the assertion private key held in the key management unit 660. The id_token verification unit 680 is a function that verifies the id_token described below by using the id_token public key held in the key management unit 660. The token provider 440 includes the functions described above.

A client registration flow and an authorization flow will be described with reference to FIGS. 5 and 13. Detailed descriptions of the processing described above will be omitted.

Figure 13:
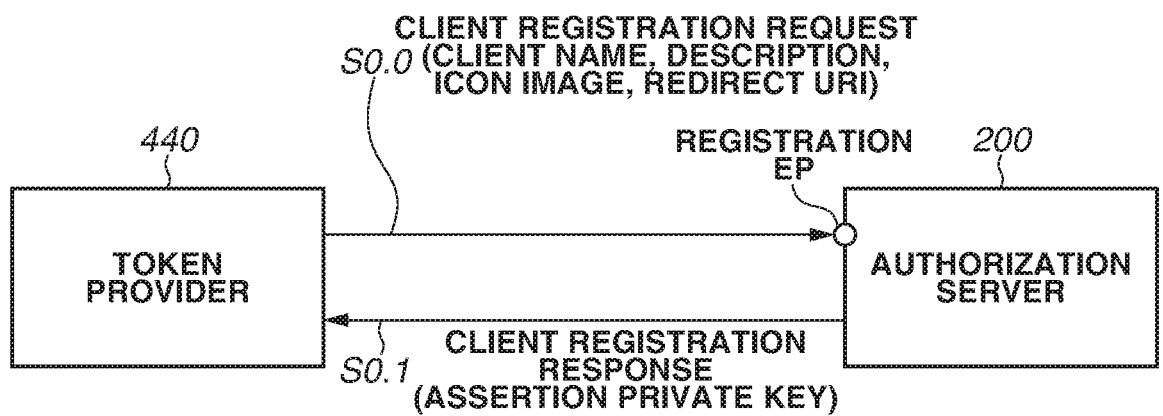
FIG. 13 is a flowchart illustrating processing performed during client registration.

Referring first to FIG. 13, processing to be performed during the client registration will be described. As a preliminary operation for executing the authorization flow according to the present exemplary embodiment based on the Authorization Code Grant in OAuth 2.0, in step S0.0, a registration request for registering the client 400 is sent to the authorization server 200. More specifically, the registration request for registering the client 400 is transmitted to a registration end point (in FIGS. 5 and 13, end points are indicated by "EP") in the authorization server 200, and the registration request processing is started when the client 400 is activated or when the client 400 is not registered at the time of starting the authorization flow in step S1.1 described below. Examples of a method for transmitting a client registration request include a method in which the client registration unit 650 of the token provider 440 actively communicates with the authorization server 200, and a method in which the user accesses the authorization server 200 through the web browser 510 to register the client 400.

The client registration request in step S0.0 includes a client name, a description, an icon image, and a redirect Uniform Resource Identifier (URI) as an essential parameter, which are to be displayed on the authorization confirmation screen described below. The redirect URI is an address that designates a transmission destination to which the client 400 transmits an authorization response described below. In step S0.1, the authorization server 200 that has received the registration request for registering the client 400 generates a client ID for identifying the client 400 and a pair of keys (an assertion public key and an assertion private key) for authenticating the client 400, and transmits the assertion private key to the client 400 as a response to the registration request for registering the client 400. As a method for transmitting the assertion private key, the assertion private key may be encrypted and transmitted using a key-exchange protocol.

The token provider 440 stores the assertion private key in the key management unit 660. The authorization server 200 holds, in an associated manner, the client ID, the assertion public key, various pieces of information acquired in step S0.0, and the redirect URI. The token provider 440 holds the client ID and the assertion private key received in step S0.1 in the key management unit 660.

The client registration illustrated in FIG. 13 is executed on the authorization server 200 that is present in the region in which the token provider 440 (client 400) is present. The information (the client ID, the assertion public key, etc.) about the client 400 that is generated and stored during the client registration is shared not only by the authorization server 200, but also by another authorization server (e.g., the authorization server 201). As a result, even when the transmission destination of the authentication request (S1.5 described below) is different from user to user, information exchange of tokens, such as the issuance of id_token described below or the issuance of the authorization token, can be executed using the client ID and the assertion public key that are shared among the authorization servers.

The client registration processing performed as a preliminary operation for executing the authorization flow has been described above.

The authorization flow performed after the client registration processing will be described with reference to FIG. 5.

In step S1.0, the user logs in to the client 400. The authentication unit 430 of the client 400 generates and holds the login context, which is information for specifying the logged-in user. By using the generated login context, it is possible to acquire the information (e.g., local user ID) for specifying the logged-in user from the login context.

In step S1.1, when the user accesses an authorization start URI through the web browser 510, the user starts the authorization flow based on OAuth 2.0 according to the present exemplary embodiment. In step S1.2, when the authorization start URI for starting the authorization flow is accessed, the client 400 transmits the authorization request to the authorization end point. The authorization end point is accessed via an all regions common URI.

<Authorization End Point>

A method for specifying the authorization end point will now be described. To select an appropriate authorization server and acquire an authorization token, the token provider 440 first transmits an authorization request to the all regions common URI. A Domain Name System (DNS) server that is accessed as a result of transmitting the authorization request manages data (DNS record) that associates an authorization end point URI with an Internet Protocol (IP) address. An access to the authorization server through the web browser is made via the DNS server, and the authorization end point URI common to the all regions is converted (name resolution) into an IP address based on the DNS record. In this case, a Geo Routing georouting function (GeoRouting function in the case of Amazon Web Services (AWS)) references a geographic database based on the IP address of the authorization request source (client 400), the IP address is converted into an appropriate authorization end point URI, and the authorization end point URI is transmitted to the authorization request transmission source.

In the present exemplary embodiment, the client 400 and the authorization server 200 are present in the same region "jp". Accordingly, in the case of accessing the all regions common URI through the web browser MO, the authorization end point URI of the authorization server 200 present in the same region "jp" is returned to the token provider 440 by the georouting function. The token provider 440 transmits the authorization request to the authorization end point URI. Step S1.2 illustrated in FIG. 5 indicates a state where the authorization request is transmitted to the authorization end point URI specified by the georouting function.

<Authorization Request>

The authorization request transmitted by the token provider 440 will be described. When the token provider 440 transmits the authorization request, a request for acquiring security information (id_token described below) is also transmitted.

The authorization request is represented in a JWT format with a signature, including response_type, client_id, redirect_uri, and a state parameter. For convenience of description, the authorization request in the JWT format is hereinafter referred to as an "authorization assertion". The authorization assertion includes a header and payload described below.

The authorization assertion is provided with a signature using the assertion private key acquired in the client registration response in step S0.1 in response to the authorization request, and ES256 (ECDSA using P-256 curve and SHA-256 hash) defined in RFC7518 JSON Web Algorithms (JWA) is used as a signature algorithm. FIG. 8A illustrates an example of the header of the authorization assertion.

In FIG. 8A, "typ" represents a type of JWT to which "Assertion" is set as a value indicating the type is the assertion JWT, "alg" represents a signature algorithm to which a value "ES256" is set, and "kid" represents an ID for the assertion public key and the assertion private key that is used to verify the signature of JWT. Examples of the value set as "kid" include a Universally Unique Identifier (UUID) and a thumbprint of a public key based on JSON Web Key (JWK) Thumbprint (RFC 7638) specifications.

FIG. 8B illustrates an example of a payload claim of the authorization assertion. In FIG. 8B, "response_type" represents a response type in OAuth 2.0. To acquire id_token in the authorization response described below, a value "id_token" is set to the "response_type".

An identifier for identifying an issuer of JWT is represented by "iss". In the case of authorization assertion, the UUID indicating a client ID is set as a value. A user identifier is represented by "sub", and the UUID indicating the client ID is set, similar to the "iss", The "iss" and "sub" are included in the authorization request in the JWT format by encoding character strings represented by using a URI-safe Base64 format for each of the "iss" and "sub". An expiration date of the authorization assertion is represented by "exp", and a date and time of issuance of the authorization assertion s represented by "iat". Both of the "exp" and "iat" are represented by elapsed seconds from the Unix Epoch (Jan. 1, 1970 (world standard time)).

The payload claim illustrated in FIG. 8B also includes "state" and "redirect_uri" representing the redirect URI in OAuth 2.0. The "state" represents information for uniquely associating the authorization request with the authorization response, and is used to prevent a cross-site request forgery (CSRF) attack or a token substitution attack. Thus, a unique value that cannot be estimated needs to be set as the "state". The client 400 that has received the authorization response described below verifies whether the value of the state matches the value of the state transmitted in the authorization request in step S1.2. To identify the local user who has executed the authorization request, the "state" issued by the client 400 is managed by the client 400 in such a manner that the "state" is associated with each of the redirect URI and the login context.

The token provider 440 creates the authorization assertion as illustrated in FIGS. 8A and 8B based on the JWT specifications. The authorization assertion is provided with a signature (not illustrated) in the JWT format by using the assertion private key described above. The authorization request has been described above.

Referring back to FIG. 5, in step S1.3, the authorization server 200 that has received the authorization request in step S1.2 returns a login screen common to the all regions to the web browser 510. The login screen includes the authorization assertion in a hidden field. In step S1.4, the user inputs the user II) and the password through the web browser 510, and sends the authentication request to the authorization server 200. At that time, the authorization assertion, which is previously received as the hidden field in the login screen, and the authentication request are simultaneously posted. In this case, the user ID transmitted to the authorization server 200 in step S1.4 is a user identifier for logging in to the authorization server and is different from the local user ID used in step S1.0.

In step S1.5, the authorization server 200 determines a user ID affiliation region (region for the authorization server to manage user information about the user specified by the user ID), and redirects the login screen to the authorization server in an appropriate region. Table 3 illustrates an example of a user affiliation region table shared among the authorization servers in different regions.

generally impossible to restore the user ID from this value. Accordingly, sharing the user affiliation region table (Table 3) among the authorization servers in the all regions does not mean that the user information is shared.

Redirect of the login screen in step S1.5 will be described. A case is described where the user ID "user2@110Ab" and the password "password" are input on the all regions common login screen in step S1.3. The authorization server 200 calculates a hash value for the input user ID. From the calculated hash value with reference to Table 3, the affiliation region "eu" of the user is specified. The user ID, the password, and the authorization assertion posted in the authentication request are returned to a cookie in the web browser 510, and are redirected, as the authentication request, to a login URI for the authorization server 201, which is the authorization server belonging to the region "eu".

The present exemplary embodiment illustrates a configuration in which the login URI for the authorization server 201 is specified from the affiliation region stored in Table 3. More specifically, the type of the login URI for each of the authorization servers in different regions is determined in advance, and the "affiliation region" illustrated in Table 3 is applied to the type, thereby specifying the login URI for each of the authorization servers. However, the configuration of the present exemplary embodiment is not limited to this configuration (Table 3). Alternatively, a configuration may be used where the login URI for each of the authorization servers and the hash value for each user ID are managed in such a manner that the login URI is associated with the hash value.

The authorization server 201 verifies whether the associating information that associates the user ID and the password, which are redirected in step S1.5, matches the associating information registered in advance. If the pieces of associating information match, the authentication token is issued. The issued authentication token is returned to the cookie in the web browser 510. Redirect of the login screen has been described above.

TABLE 3

User Affiliation Region Table

| No. | User ID (Hash Value) | Affiliation Region |
|---|---|---|
| 1 | b927736961c523464a5559982a527eccd18277cbeeec092ea67959990241bcc3 | jp |
| 2 | 8afe0cae0d1a4fbb380348ff1999aa1d40ecf829a730b82bdcb6a628796b51b2 | eu |
| 3 | 25dac1eaecc81673cb64157be38babb6a13b53b020e2d88dfdca70054c84cf03 | jp |

The user ID (hash value) is a hash value calculated by a Secure Hash Algorithm (SHA)-256 algorithm for each user ID character string. The affiliation region is a region to which the user specified by the user ID belongs. Table 3 illustrates that the affiliation region of "user 1@110AA" (hash value: b927736961c523464a5559982a527eccd182-77cbeeec092ea67959990241bcc3) is "jb", the affiliation region of "user2@110Ab" (hash value: 8afe0cae0d1a4thb-380348ff1999aa1d40ecf829a730b82bdcb6a628796b51b2) is "eu", and the affiliation region of "user3@120AA" (hash value: 25dac1eaecc81673cb64157be38babb6a13b53b020e-2d88dfdca70054c84cf03) is "jp".

Figure 12:
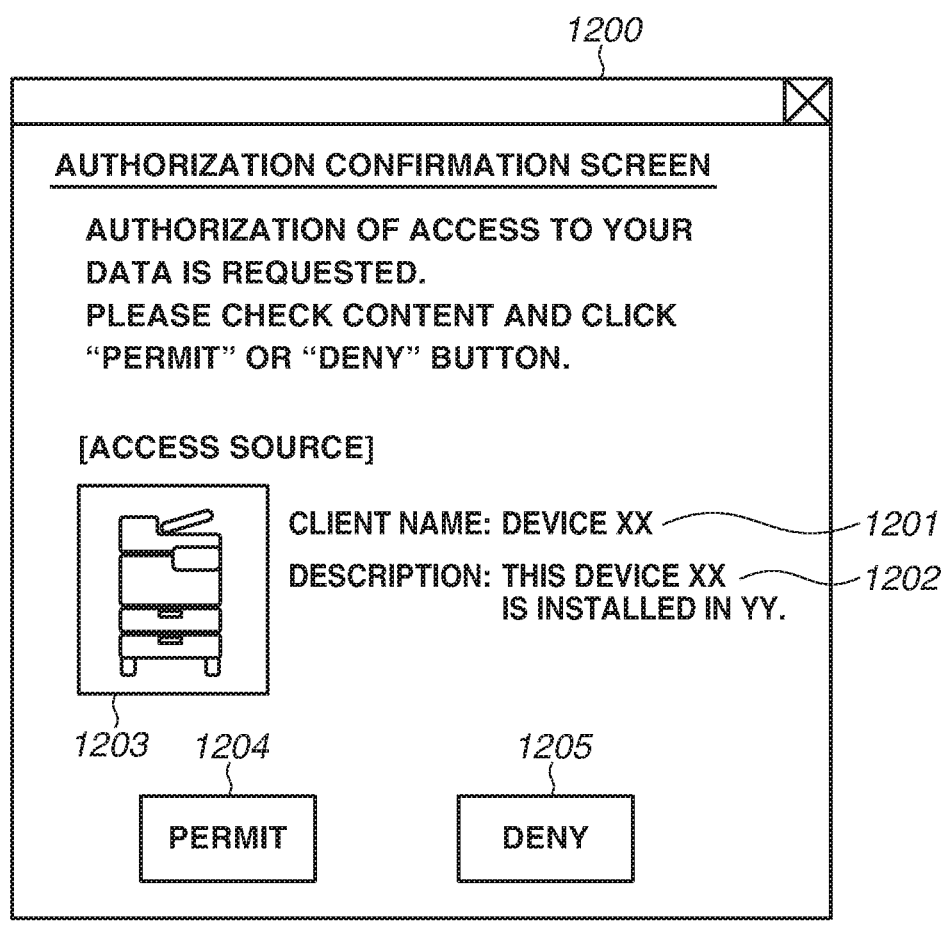
FIG. 12 is a diagram illustrating an example of an authorization confirmation screen.

The user affiliation region table (Table 3) is updated during the user registration, and latest data is periodically shared among the authorization servers in the all regions. Since the user D is represented by a hash value, it is Referring back to FIG. 5, in step S1.6, the authorization server 201 returns, to the web browser 510, the authorization confirmation screen used for confirming whether the user agrees to the authorization of the client 400. FIG. 12 illustrates an example of the authorization confirmation screen. An authorization confirmation screen 1200 includes a client name 1201 of the client 400 to be authorized, a description 1202 about the client 400, and an icon image 1203, as contents with which the user is asked to agree. The authorization confirmation screen 1200 also includes a "PERMIT" button 1204 used by the user to authorize the client 400, and a "DENY" button 1205 used by the user to deny the authorization. Processing to be performed when the "DENY" button 1205 is pressed or processing to be performed when the "PERMIT" button 1204 is pressed (S1.7) will be described below.

The authorization confirmation screen includes, as a hidden field, the authorization assertion included in the redirected authentication request. However, after the signature of the authorization assertion included in the authentication request is verified, if a combination of the client ID and the redirect URI included in the authorization assertion does not match a combination of the client ID and the redirect URI shared with the authorization server 201 and an authorization server in another region, an error screen is returned to the web browser 510 instead of the authorization confirmation screen. Thus, an unauthorized redirect to a login URI can be prevented. Similarly, when the "DENY" button 1205 of the authorization confirmation screen 1200 is pressed, the error screen is transmitted to the web browser 510.

If the user who has logged in to the authorization server 201 has completed the authorization operation using the same client ID, the processing of steps S1.6 and S1.7 can be omitted.

After the "PERMIT" button 1204 is pressed and the authorization operation is executed by the user in step S1.7, in step S1.8, the authorization server 201 posts the authorization assertion included in the authorization operation to the authorization end point of the authorization server 201. The authorization server 201 verifies the authorization assertion posted to the authorization end point. The reason for verifying the authorization assertion in this case is that the authorization assertion is an instruction (authorization operation in this case) received from an apparatus (web browser 510), which is external to the authorization server 201. Thus, there is a need to verify whether the content of the authorization assertion is not falsified.

If the verification of the authorization assertion is successful, in step S1.9, id_token is generated, and the generated id_token is transmitted as the authorization response to the redirect URI for the client 400. More specifically, the generated id_token is transmitted to the client 400 from the authorization server 201 through the web browser 510. In transmitting the generated id_token, the id_token is provided as a query parameter for the redirect URI and is transmitted to the web browser 510. As a result, the id_token is redirected to a destination designated by the redirect URI. The id_token generated by the authorization server 201 is stored in the authorization server 201 in association with the client ID, the user ID, and the redirect URI.

If the verification of the authorization assertion is unsuccessful in step S1.8, the authorization server 201 returns an authorization error to the web browser 510.

<id_token>

The id_token generated by the authorization server 201 is a security token including a claim about the end user authentication by the authorization server, and is defined in OpenID Connect specifications (OpenID Foundation OpenID Connect Core 1.0). The id_token includes region information about the region in which the authorization token is used, and is represented by a JSON Web Token with a signature (JWT RFC7518, JWT RFC7515). In general, the id_token includes a claim set about the end user authentication (claims about the authentication), and a claim set about the other user attributes. The id_token according to the present exemplary embodiment includes "iss", "sub", "aud", "exp", "iat", and "nonce" in the payload claim.

The signature of the id_token is provided using the id_token private key, and an ES256 signature defined in the JWA is used as a signature algorithm. FIG. 9A illustrates an example of the header of the id_token. Descriptions of the parts described above with reference to FIGS. 8A and 8B will be omitted.

The header of the id_token includes the signature algorithm "ES256" of the id_token represented by "alg" and "kid" representing an ID for the id_token public key and the id_token private key that is used to verify the signature of the id_token. As "kid", the UUID and a thumbprint of a public key based on MK Thumbprint (RFC 7638) specifications may be used.

FIG. 9B illustrates an example of a claim about a user attribute present in the payload of the id_token. A URI starting with "https://" that does not include a query and a fragment portion is set to "iss" based on the definition of OpenID Connect Core 1.0. In this case, since an issuer of the id_token is the authorization server 201, "https://eu-auth.example.com" representing the authorization server 201 is set.

An issuance object of the id_token is represented by "aud". In this case, a value of the client ID is set as the "aud". The "sub" and "aud" are character strings each represented in a URI-safe Base64 format. The id_token includes "nonce" mainly for a purpose of preventing a replay attack, and a value of the "state" parameter is set as the "nonce". The id_token has been described above.

Referring back to FIG. 5, the id_token private key is required for providing the signature to the id_token, and the id_token public key is required for verifying the id_token. A case is described where the id_token private key is shared in advance among the authorization servers in respective regions and the id_token public key is preliminarily stored in the client 400.

The client 400 that has received the authorization response in step S1.9 verifies the signature (not illustrated) of the id_token included in the authorization response, and determines whether the "nonce" included in the id_token matches the "state" managed by the client 400. If it is determined that the "nonce" matches the "state", the client 400 acquires the URI for the authorization server 201, which is the issuer of the id_token, with reference to the "iss" in the id_token. In this case, the id_token verification unit 680 of the token provider 440 acquires the URI "https://eu-auth.example.com" for the authorization server 201 with reference to the "iss" in the id_token. A region character string is recognized with reference to a character string "eu" before the hyphen in a host name "eu-auth" in the acquired URI for the authorization server 201. The recognized region character string is stored in the token database (Table 2).

The token database also stores the local user ID of the user who is currently logged in to the client 400. In step S2.0, a token request for acquiring the authorization token is transmitted to the token end point of the authorization server 201. The token request is described in the JWT format. To distinguish the token request from the assertion JWT used during the authorization request, the token request in the JWT format is hereinafter referred to as "token assertion". The token assertion includes a header and a payload. The token assertion also includes a client ID, a user ID acquired from a sub claim in the id_token, and a redirect URI. FIG. 10A illustrates an example of the header of the token assertion.

In FIG. 10A, "typ" represents a type of MT to which "Assertion" is set as a value indicating the type is the assertion JWT. The header also includes "alg" representing a signature algorithm that is set to "ES256", and "kid" representing an ID for the assertion public key and the assertion private key that is used to verify the signature of JWT. As "kid", the UUID and a thumbprint value for a public key based on JWK Thumbprint (RFC 7638) specifications may be used.

FIG. 10B illustrates an example of the payload claim about the token assertion. Descriptions of the parts described above will be omitted.

In FIG. 10B, "response_type" represents a response type in OAuth 2.0 to which "id_token" is set. The payload claim also includes "iss" representing a client ID in OAuth 2.0, "redirect_uri" representing a redirect URI in OAuth 2.0, and "sub" representing a user identifier. In the present exemplary embodiment, the value included in the id_token previously acquired is set as the "sub".

The token provider 440 creates the token assertion including the header and the payload as illustrated in FIGS. 10A and 10B based on the NTT specifications. The token assertion includes the signature provided using the assertion private key acquired in the client registration response (details of the signature in JWT is omitted).

The authorization server 201 that has received the token request in step S2.0 verifies the signature of the token assertion by using the assertion public key. Further, the authorization server 201 analyzes the token assertion received in step S2.0, and acquires the "iss", the "sub", the "redirect_uri", the "iat", and the "exp", By analyzing the acquired information, the authorization server 201 can verify whether the client 400 that has transmitted the authorization request in step S1.2 matches the client 400 that has transmitted the token request in step S2.0, and whether the user information about the user who requests the authorization token is present in the authorization server 201.

If the verification is successful, in step S2.1, the authorization server 201 transmits the authorization token as the token response to the client 400. The token management unit 630 of the token provider 440 stores the acquired authorization token in the token database (Table 2).

In step S3.0, the token distribution unit 640 of the token provider 440 searches for the user ID of the user who is currently logged in from the token database (Table 2) included in the token management unit 630, and acquires the region information and the authorization token. The acquired region information and authorization token are transmitted to the application 420.

In step S3.1, the application 420 accesses the API released by the resource server 301 based on the received authorization token and region information. More specifically, the application 420 accesses the API released by the resource server 301 by using a resource server URI (not illustrated) for each region that is preliminarily incorporated in the application 420 and the region information acquired from the token provider 440. In the present exemplary embodiment, the resource request in step S3.1 is transmitted to the resource server 301 that is present in the same region "eu" as the authorization server 201 that manages the user information.

The authorization flow has been described above. According to the present exemplary embodiment, it is possible to appropriately select the authorization server in which the user information is present without any manual operation by the user, and to enable the selected authorization server to issue the authorization token. In addition, by using the acquired authorization token, it is possible to request the resource server in the region in which the user information is present to send resources.

A second exemplary embodiment describes a configuration in which acquisition of a token is continued in a case where a user moves to another region after the authorization request (S1.2) and the authorization response (S1.9) are normally completed and before the token request is transmitted (S2.0).

More specifically, a case is assumed where the user authorized in steps S1.2 to S1.9 has moved to another region due to a business trip, moving home, or the like. In this case, user information about the user who has moved needs to be moved to the authorization server in the region of the movement destination. A situation is assumed where, during the movement of the user information, the token request is transmitted to the authorization server that has authorized the user before the user moves to another region.

Figure 6:
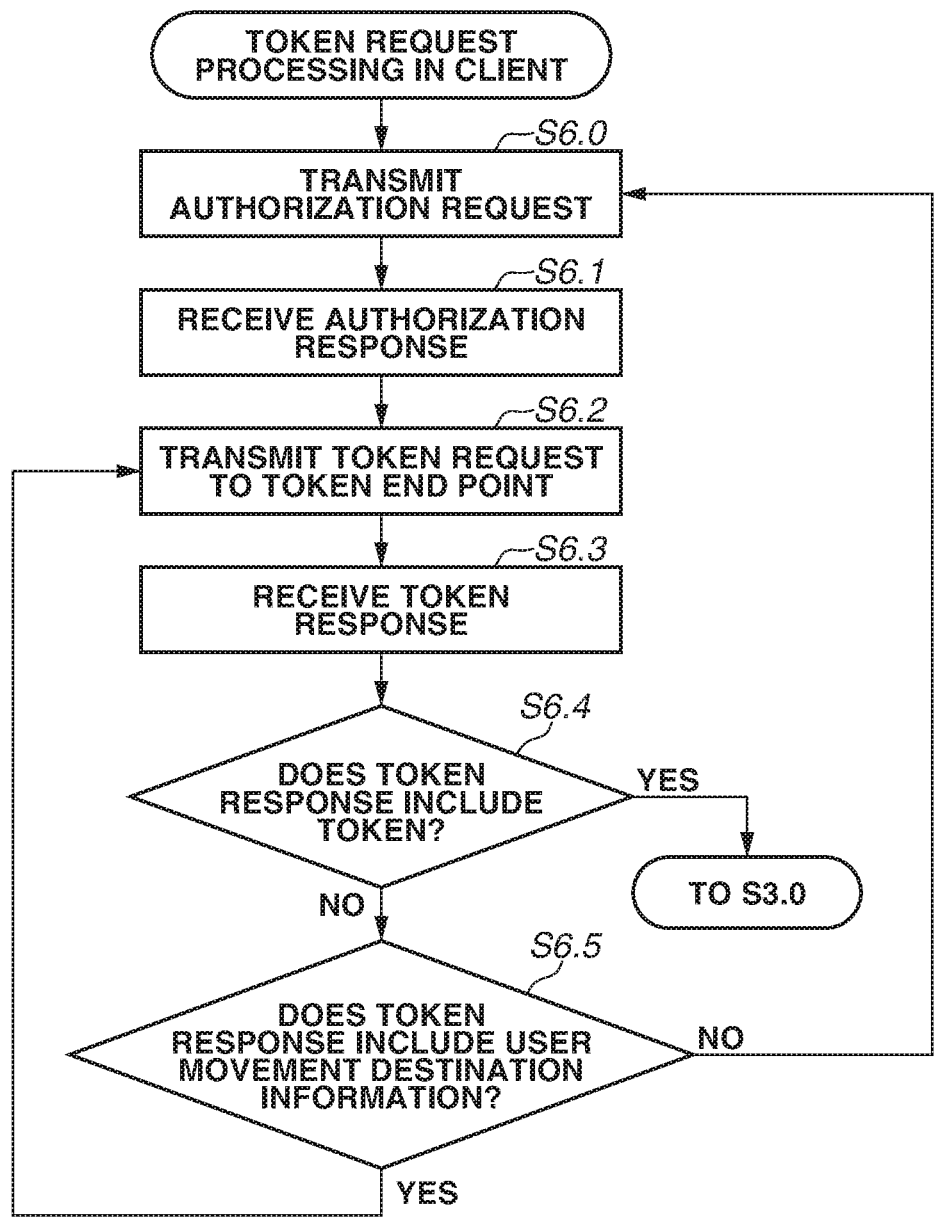
FIG. 6 is a flowchart illustrating token request processing in a client.

Referring first to FIG. 6, processing to be performed when the user information about the authorized user is moved from the authorization server 201 during a period from the authorization response (S1.9) to the token request (S2.0). The processing illustrated in FIG. 6 is token request processing to be executed mainly by the token provider 440 (client 400).

In step S6.0, the token provider 440 transmits the authorization request to the authorization server 200. This processing is similar to the processing of step S1.2 in the first exemplary embodiment. In step S6.1, the token provider 440 receives the authorization response. This processing is similar to step S1.9 in the first exemplary embodiment. In this case, the token provider 440 verifies id_token included in the authorization response. After the verification, in step S6.2, the token provider 440 transmits the token request (token assertion) in the JWT format to the token end point of the authorization server 201, and in step S6.3, the token provider 440 receives the token response to the token request. In step S6.4, the token provider 440 analyzes the token response and determines whether the token response includes the authorization token. If it is determined that the authorization token is included (YES in step S6.4), the processing proceeds to step S3.0, similar to the first exemplary embodiment. If it is determined that the authorization token is not included (NO in step S6.4), the processing proceeds to step S6.5. In step S6.5, the token provider 440 determines whether the token response includes user movement destination information.

FIG. 11 illustrates an example of the token response including the user movement destination information. In FIG. 11, "destination_uri" represents a movement destination token end point that is determined by the authorization server 201 as a movement destination of user information based on the user movement destination information described below.

If it is determined that the token response includes the user movement destination information in step S6.5 (YES in step S6.5), the processing returns to step S6.2, and the token request is transmitted again to the movement destination token end point specified by the user movement destination information. The processing of steps S6.2 to S6.5 is repeatedly executed as long as the "destination_uri" is included in the token response. In this case, however, a configuration may also be used where an error occurs in the token provider 440 when the number of times of execution exceeds a certain value or when a certain period of time elapses, whereby the processing is terminated.

In step S6.5, if it is determined that the user movement destination information is not present in the token response (NC) in step S6.5), the processing returns to step S6.0, and the token provider 440 transmits the authorization request to the authorization server 200. The processing returning to step S6.0 from step S6.5 is repeatedly executed until the user movement destination information is included in the token response. However, similar to the processing returning to step S6.2, a configuration may also be used where an rapper limit is set for the number of times of execution or processing time, and an error occurs in the token provider 440 when the upper limit is exceeded, whereby the processing is terminated. The processing illustrated in FIG. 6 has been described above.

Referring to FIG. 7, processing in which the authorization server 201 that has received the token request from the token provider 440 transmits the token response will be described. Similar to step S2.0, in step S7.1, the authorization server 201 receives the token assertion at the token end point. In step S7.2, the authorization server 201 verifies the token assertion by using the assertion public key, and acquires the user identifier from "sub". At that time, in step S7.3, the authorization server 201 determines whether the acquired user identifier is present in the authorization server 201. If it is determined that the user identifier is present in the authorization server 201 (YES in step S7.3), the processing proceeds to step S7.4. In step S7.4, the authorization token is transmitted as the token response to the client 400, similar to step S2.1 of the first exemplary embodiment. If it is determined that the user identifier is not present in the authorization server 201 (NO in step S7.3), the processing proceeds to step S7.5. In step S7.5, it is determined whether the user identifier is present in a user information destination table. Table 4 illustrates an example of the user information movement destination table to be referenced in the determination.

TABLE 4

User Information Movement Destination Table

| No. | User Identifier | Movement Destination Token End Point |
|---|---|---|
| 1 | dXN1cjJAMTEwQUI | https://us.example.com/oauth2/token |

The user information movement destination table includes columns for the user identifier and the movement destination token end point. The movement destination token end point represents a token end point URI for the authorization server of the movement destination of user information when the user information is moved to the authorization server in another region.

More specifically, in step S7.5, the authorization server 201 determines whether the user identifier "dXN1cjJAMTEwQUI" included in the "sub" of the token assertion is present. If it is determined that the user identifier is present (YES in step S7.5), the processing proceeds to step S7.6. In step S7.6, the authorization server 201 acquires the corresponding movement destination token end point, and transmits the token response in which the movement destination token end point URI is described as the "destination_uri" to the token provider 440, The "destination_uri" represents the "user movement destination information" described in the processing illustrated in FIG. 6.

If it is determined that the user identifier is not present in step S7.5 (NO in step S7.5), the authorization server 201 transmits an error response to the token provider 440 and terminates the processing.

According to the present exemplary embodiment, it is possible to continue the processing until the authorization token is acquired without authorizing the user again even in a case where the token request is executed when the user information about the authorized user is transmitted to another authorization server.

The exemplary embodiments above describe a configuration in which the georouting function is used to transmit the authorization request to the authorization server 200 that is geographically close to the token provider 440 (client 400). This configuration is employed in view of an access time or the like. However, the method for determining the transmission destination of the authorization request is not particularly limited thereto as long as the transmission destination is an authorization server that shares the user affiliation region table (Table 3).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-022405, filed Feb. 9, 2018, which is hereby incorporated by reference herein in its entirety.

What is claimed is:

1. An information processing system comprising:
a client configured to transmit an authorization request used by a user to authorize access by the client to a resource server; and
two or more authorization servers present in different regions,
wherein the authorization servers each include a first specifying unit configured to specify a first authorization server in which user information about the user who authorizes the access is located,
wherein the authorization servers each include a first transmission unit configured to cause, upon receiving the authorization request from the client, the first specifying unit to specify the first authorization server and to redirect the authorization request to the first authorization server with the client being specified,
wherein the first authorization server includes a second transmission unit configured to authenticate the user based on the redirected authorization request from the client, and to transmit, to the client, an authorization response as a response to the authorization request together with information indicating, as a transmission destination, the first authorization server in which the user information about the authenticated user is located, wherein the client includes a third transmission unit configured to transmit a token request for requesting an authorization token for accessing the resource server to the first authorization server that is specified by a second specifying unit based on the authorization response transmitted by the second transmission unit, and wherein the first authorization server includes an issuance unit configured to issue the authorization token in response to the token request transmitted by the third transmission unit.

2. The information processing system according to claim 1, wherein the client acquires the authorization token issued by the issuance unit, and uses the acquired authorization token to access the resource server.

3. The information processing system according to claim 1, wherein the authorization request transmitted from the client to the authorization servers is transmitted from the client to a common Uniform Resource Identifier (URI) through a web browser, and is transmitted to any one of the two or more authorization servers present in the different regions.

4. The information processing system according to claim 3, wherein the authorization request transmitted to the common URI is transmitted to an authorization server located geographically close to the client that has transmitted the authorization request.

5. The information processing system according to claim 1,
wherein the first specifying unit manages first information in which a hash value of a user identifier for identifying the user and region information about the first authorization server in which the user information about the user is present are associated with each other, and
wherein the first specifying unit calculates a hash value of a user identifier included in the authorization request, and specifies the region information about the first authorization server based on the calculated hash value and the first information.

6. The information processing system according to claim 1, wherein the authorization response includes information indicating the first authorization server as a destination, and signature information about the information indicating the first authorization server as the destination.

7. The information processing system according to claim 6,
wherein the first authorization server further includes a first management unit configured to manage an encryption key for providing the authorization response with the signature information, and
wherein the client further includes a second management unit configured to manage a decryption key for verifying the signature information.

8. The information processing system according to claim 1,
wherein the client further includes a third management unit configured to manage an encryption key for providing the authorization request with signature information,
wherein the first authorization server further includes a fourth management unit configured to manage a decryption key for verifying the signature information provided to the authorization request,
wherein the encryption key managed by the third management unit provides the token request for acquiring the authorization token with signature information, and
wherein the decryption key managed by the fourth management unit verifies the signature information provided to the token request.

9. The information processing system according to claim 8, wherein the decryption key managed by the fourth management unit is shared among the two or more authorization servers present in the different regions.

10. The information processing system according to claim 1,
wherein the authorization servers each further include a third specifying unit configured to specify an authorization server of a movement destination to which the user information is moved,
wherein the client further includes:
a first verification unit configured to verify whether a response to the token request for acquiring the authorization token includes the authorization token; and
a second verification unit configured to verify whether the response to the token request for acquiring the authorization token includes information about the movement destination of the user information specified by the third specifying unit, and
wherein in a case where the first verification unit determines that the response to the token request does not include the authorization token, the second verification unit verifies whether the response to the token request includes the information about the movement destination.

11. The information processing system according to claim 10, wherein in a case where the second verification unit verifies that the response to the token request includes the information about the movement destination, the token request for requesting the authorization token is transmitted to the movement destination.

12. The information processing system according to claim 10, wherein the third specifying unit specifies the movement destination by using a user identifier included in the token request received from the client.

13. A control method for an information processing system including:
a client configured to transmit an authorization request used by a user to authorize access by the client to a resource server; and
two or more authorization servers present in different regions,
the control method comprising:
specifying, by the authorization servers, a first authorization server in which user information about the user who authorizes the access is located;
causing the authorization servers, upon receiving the authorization request from the client, to specify the first authorization server and to redirect the authorization request to the first authorization server with the client being specified;
authenticating the user, by the first authorization server, based on the redirected authorization request from the client, and transmitting, by the first authorization server, to the client, an authorization response as a response to the authorization request together with information indicating, as a transmission destination for transmitting a token request, the first authorization server in which the user information about the authenticated user is located;

transmitting, by the client, a token request for requesting an authorization token for accessing the resource server to the first authorization server that is specified by the client based on the authorization response received from the first authorization server; and issuing, by the first authorization server, the authorization token in response to the token request received from the client.

\* \* \* \* \*